(12) United States Patent
Aki et al.

(10) Patent No.: US 11,110,451 B2
(45) Date of Patent: Sep. 7, 2021

(54) MICRO-CHANNEL DEVICE AND METHOD FOR MANUFACTURING MICRO-CHANNEL DEVICE

(71) Applicant: SONY CORPORATION, Tokyo (JP)

(72) Inventors: Yuichi Aki, Tokyo (JP); Masaru Fujii, Tokyo (JP); Toshihiro Nakajima, Tokyo (JP); Masanori Okazaki, Kanagawa (JP); Tomomi Yukumoto, Chiba (JP)

(73) Assignee: SONY CORPORATION, Tokyo (JP)

( * ) Notice: Subject to any disclaimer, the term of this patent is extended or adjusted under 35 U.S.C. 154(b) by 452 days.

(21) Appl. No.: 15/761,167

(22) PCT Filed: Jul. 13, 2016

(86) PCT No.: PCT/JP2016/070672
§ 371 (c)(1),
(2) Date: Mar. 19, 2018

(87) PCT Pub. No.: WO2017/056638
PCT Pub. Date: Apr. 6, 2017

(65) Prior Publication Data
US 2018/0257072 A1    Sep. 13, 2018

(30) Foreign Application Priority Data

Sep. 30, 2015 (JP) .............................. JP2015-195120

(51) Int. Cl.
*B01L 3/00* (2006.01)
*G01N 35/08* (2006.01)
*G01N 37/00* (2006.01)

(52) U.S. Cl.
CPC ..... *B01L 3/502707* (2013.01); *B01L 3/50273* (2013.01); *B01L 3/502738* (2013.01);
(Continued)

(58) Field of Classification Search
CPC ......... B01L 3/502707; B01L 3/502738; B01L 3/50273; G01N 37/00; G01N 35/08
See application file for complete search history.

(56) References Cited

U.S. PATENT DOCUMENTS

| 6,565,927 B1 * | 5/2003 | Drzal .................... B05D 3/062 427/398.1 |
| 2003/0087982 A1 * | 5/2003 | Kanazawa ............ H01M 2/162 522/49 |

(Continued)

FOREIGN PATENT DOCUMENTS

| CN | 101329276 A | 12/2008 |
| EP | 2657708 A1 | 10/2013 |

(Continued)

OTHER PUBLICATIONS

International Search Report & Written Opinion of PCT Application No. PCT/JP2016/070672, dated Oct. 18, 2016, 10 pages.

*Primary Examiner* — Daniel McNally
(74) *Attorney, Agent, or Firm* — Chip Law Group

(57) ABSTRACT

To provide a high-quality and high-performance micro-channel device which can be manufactured by a simple method. Provided is a micro-channel device used in analyzing a sample. The micro-channel device includes at least two substrates and an elastic film interposed between the two substrates. The substrates are thermally fused to the elastic film in at least a part thereof. Also provided is a method for manufacturing a micro-channel device used in analyzing a sample. The method includes a surface activation step of activating a joining surface of a substrate and/or an elastic film, a lamination step of laminating the elastic film between at least two of the substrates, and a thermal fusion step of thermally fusing the substrates to the elastic film in at least a part thereof.

5 Claims, 7 Drawing Sheets

(52) U.S. Cl.
CPC ............ *G01N 35/08* (2013.01); *G01N 37/00* (2013.01); *B01L 2200/12* (2013.01); *B01L 2300/0887* (2013.01); *B01L 2300/123* (2013.01)

(56) References Cited

U.S. PATENT DOCUMENTS

| | | |
|---|---|---|
| 2008/0057274 A1 | 3/2008 | Hagiwara et al. |
| 2008/0317627 A1 | 12/2008 | Shirai et al. |
| 2010/0303687 A1* | 12/2010 | Blaga ................. B01L 3/50273 422/504 |
| 2011/0240127 A1* | 10/2011 | Eberhart ............. F16K 99/0059 137/1 |
| 2013/0273487 A1 | 10/2013 | Asogawa et al. |

FOREIGN PATENT DOCUMENTS

| | | |
|---|---|---|
| JP | 2001-030440 A | 2/2001 |
| JP | 2004-154898 A | 6/2004 |
| JP | 2005-062413 A | 3/2005 |
| JP | 2006-136837 A | 6/2006 |
| JP | 2006-187730 A | 7/2006 |
| JP | 2007-136292 A | 6/2007 |
| JP | 2007-309868 A | 11/2007 |
| JP | 2009-002806 A | 1/2009 |
| JP | 2009-539883 A | 11/2009 |
| JP | 2011-133402 A | 7/2011 |
| JP | 2013-035258 A | 2/2013 |
| JP | 2013-062263 A | 4/2013 |
| WO | 2011/086734 A1 | 7/2011 |
| WO | 2012/086168 A1 | 6/2012 |

\* cited by examiner

MICRO-CHANNEL DEVICE AND METHOD FOR MANUFACTURING MICRO-CHANNEL DEVICE

CROSS REFERENCE TO RELATED APPLICATIONS

This application is a U.S. National Phase of International Patent Application No. PCT/JP2016/070672 filed on Jul. 13, 2016, which claims priority benefit of Japanese Patent Application No. JP 2015-195120 filed in the Japan Patent Office on Sep. 30, 2015. Each of the above-referenced applications is hereby incorporated herein by reference in its entirety.

TECHNICAL FIELD

The present technology relates to a micro-channel device. More specifically, the present technology relates to a micro-channel device and a method for manufacturing the micro-channel device.

BACKGROUND ART

In recent years, importance of analysis for bedside diagnosis (point of care (POC) analysis) that performs measurement necessary for medical diagnosis in the vicinity of a patient, performance of analysis of harmful substances in rivers and wastes at a site such as a river or a waste disposal site, or performance of analysis and measurement at a site where analysis and measurement are required or in the vicinity of the site, such as a pollution test at each site of cooking, harvesting, importing foods (hereinafter, referred to as "POC analysis or the like") has attracted attention.

In such POC analysis or the like, a device for performing a micro reaction or analysis, for example, by disposing fine grooves (channels) and reservoirs (chambers) in order of sub μm to mm in a substrate and causing a fluid to flow in the channels, classified into a microscale total analysis system (μTAS), Lab-on-Chip, or the like, has been proposed, and some of the devices have been put to practical use.

For example, Patent Documents 1 and 2 disclose a method for manufacturing a microchip by activating and bonding surfaces of joining surfaces of two substrates. As a method for surface activation, for example, Patent Document 2 discloses a surface activation method for irradiation with a vacuum ultraviolet ray (for example, 200 to 120 nm, particularly 172 nm).

Furthermore, Patent Documents 3 and 4 disclose a microchip formed by bonding two substrates with an intermediate adhesive resin interposed therebetween. This microchip constitutes a channel or the like by bonding the substrates together while a recess or the like is formed on each of the substrates.

In addition, Patent Document 5 discloses a chip having a microvalve structure, and Patent Document 6 discloses a microchip combining a pneumatic circuit and a fluid circuit.

CITATION LIST

Patent Document

Patent Document 1: Japanese Patent Application Laid-Open No. 2004-154898
Patent Document 2: Japanese Patent Application Laid-Open No. 2006-187730
Patent Document 3: Japanese Patent Application Laid-Open No. 2006-136837
Patent Document 4: Japanese Patent Application Laid-Open No. 2007-136292
Patent Document 5: Japanese Patent Application Laid-Open No. 2001-30440
Patent Document 6: Japanese Translation of PCT International Application Publication No. 2009-529883

SUMMARY OF THE INVENTION

Problems to be Solved by the Invention

As described above, microchips in various forms are being developed, but there are still many problems.

For example, in a case of manufacturing a microchip by a method described in Patent Documents 1 to 4, a microchip including a channel, a reservoir, a supply/discharge port, and the like can be constituted, but it is difficult to manufacture a microchip including a valve, a pump, and the like in a chip and capable of performing more complicated mixing of fluids, filtering, washing, and the like.

In addition, in order to manufacture a microchip described in Patent Documents 5 and 6, it is necessary to individually dispose and bond minute valves, bellows, and the like disposed on a substrate. There are many complicated problems such as many steps and much time and maintenance of bonding accuracy, and there is a need for improvement in quality and cost of the microchip.

Therefore, a main object of the present technology is to provide a high-quality and high-performance micro-channel device which can be manufactured by a simple method.

Solutions to Problems

As a result of intensive studies to solve the above-described object, the present inventors have succeeded in manufacturing a high-quality and high-performance micro-channel device by a simple method by paying attention to the structure of the device, and have completed the present technology.

That is, first, the present technology provides a micro-channel device used in analyzing a sample, in which the micro-channel device includes at least two substrates and an elastic film interposed between the two substrates, and at least a part of the substrates is thermally fused to at least a part of the elastic film. A part of the elastic film can also function as a valve and/or a pump. A portion of the elastic film not thermally fused to the substrate can function as the valve and/or the pump. In addition, a portion of the substrate not thermally fused to the elastic film can be a channel.

Next, the present technology provides a method for manufacturing a micro-channel device used in analyzing a sample, the method including: a surface activation step of activating a joining surface of a substrate and/or an elastic film; a lamination step of laminating the elastic film between at least two of the substrates; and a thermal fusion step of thermally fusing at least a part of the substrates to at least a part of the elastic film.

In the surface activation step, irradiation with an energy ray can be performed. For example, as the irradiation with an energy ray, irradiation with an ultraviolet ray can be performed.

In this case, an ultraviolet ray in the irradiation with the ultraviolet ray can have a wavelength of 200 nm or more. In addition, the irradiation with an ultraviolet ray can also be performed in an ozone atmosphere.

In the surface activation step, a part of a joining surface can be activated while a part of the substrate and/or the elastic film is masked.

Before the lamination step, a flattening step of flattening the substrate and/or the elastic film can be performed.

Effects of the Invention

According to the present technology, it is possible to provide a high-quality and high-performance micro-channel device which can be manufactured by a simple method.

Note that the effects described herein are not necessarily limited, and may be any of the effects described in the present technology.

BRIEF DESCRIPTION OF DRAWINGS

FIG. 8 is a schematic perspective view of the elastic film 12 of the micro-channel device 1 according to the third embodiment as viewed from the laminated surface side to the substrate 11a.

MODE FOR CARRYING OUT THE INVENTION

Hereinafter, preferred embodiments for implementing the present technology will be described with reference to the drawings. The embodiments described below exemplify representative embodiments of the present technology, and the scope of the present technology is not narrowly interpreted by the embodiments. Note that description will be made in the following order.

Figure 1:
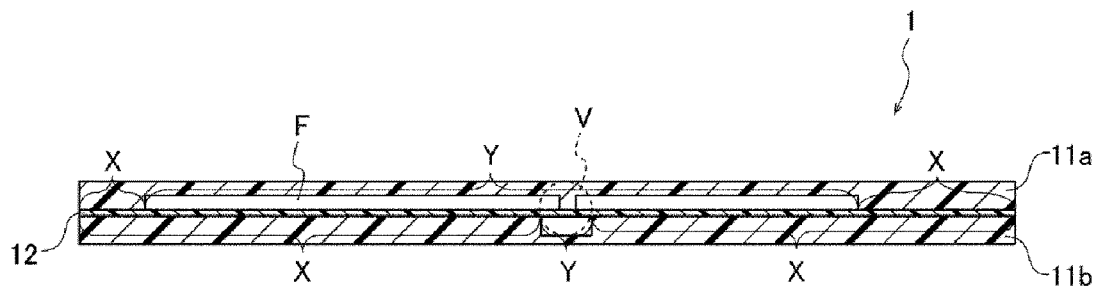
FIG. 1 is a schematic end view schematically illustrating a first embodiment of a micro-channel device 1 according to the present technology.

1. Micro-Channel Device 1
   (1) Overview
   (2) Substrates 11a and 11b
   (3) Elastic film 12
2. Method for Manufacturing Micro-Channel Device
   (1) Surface activation step I
   (2) Lamination step II
   (3) Thermal fusion step III
   (4) Flattening step IV
1. Micro-Channel Device 1
   (1) Overview FIG. 1 is a schematic end view schematically illustrating a first embodiment of a micro-channel device 11 according to the present technology. The micro-channel device 11 according to the present technology includes at least two substrates 11a and 11b and an elastic film 12 if being roughly divided.

The elastic film 12 is interposed between the two substrates 11a and 11b, and the substrates 11a and 11b are thermally fused to the elastic film 12 in at least a part thereof. That is, at least a part of the substrates 11a and 11b is integrated with at least a part of the elastic film 12 by thermal fusion. For example, in FIG. 1 illustrating the first embodiment, a portion denoted by reference sign X indicates a portion thermally fused, and a portion denoted by reference sign Y indicates a portion not thermally fused.

In addition, a portion of the elastic film 12 not thermally fused to either of the substrates 11a and 11b (see reference sign V in FIG. 1) can function as a functional film functioning as a valve, a pump, or the like. By causing a part of the elastic film 12 to function as a functional film, it is possible to perform complicated operation such as feeding a liquid into the micro-channel device 1, mixing, stirring, cleaning, fractionating (filtering), storing a liquid, or feeding a liquid outside the micro-channel device 1.

Conventionally, there is a microchip formed by bonding two substrates with an intermediate adhesive resin interposed therebetween (Patent Documents 3 and 4 and the like). However, the intermediate adhesive resin is used for bonding, and is necessarily bonded to either of upper and lower substrates. Therefore, unlike the present technology, there is no portion that is not thermally fused to either of the substrate 11a and 11b. That is, there is no microchip based on an idea that an intermediate adhesive resin functions as a functional film.

In addition, in related art represented by the above-described Patent Documents 5 and 6, a chip having a functional film is disclosed. However, this functional film is individually disposed or bonded in a necessary portion. As a result, manufacturing is complicated, not only manufacturing cost and manufacturing time are increased, but also it is difficult to maintain accuracy of a manufactured chip or the like.

In addition, in related art, a method in which a functional film is joined with an adhesive or the like or disposed while being interposed between two substrates is adopted. In a case of using an adhesive, not only a manufacturing process is complicated, but also an eluate which may inhibit a chemical reaction and a biochemical reaction in a microchip may be generated, or chemical and physical problems such as blockage of a channel or the like due to protrusion of an adhesive and failure to maintain a desired shape of the channel occur. In addition, in the method in which a functional film is disposed while being interposed between two substrates, a problem such as leakage of a sample or a reagent from an interposed portion occurs.

Meanwhile, in the present technology, a portion of the elastic film 12 other than a portion functioning as a functional film is thermally fused to and integrated with the substrate 11a and/or 11b, and one elastic film 12 also plays a role of joining the substrates 11a and 11b to each other. Therefore, there is an advantage that a manufacturing process is simple. In addition, in the present technology, the elastic film 12 is integrated with the substrate 11a and/or 11b by thermal fusion without using an adhesive. Therefore, there is no concern of a chemical reaction, a biochemical reaction, or the like, and a physical problem due to protrusion of an adhesive does not occur. Furthermore, in the thermally fused portion, the elastic film 12 is integrated with the substrate 11a and/or 11b. Therefore, a problem such as leakage of a sample or a reagent does not occur.

In addition, in the present technology, at least two substrates and one elastic film can constitute a micro-channel device. Therefore, the number of components can be largely reduced, and the present technology can contribute to cost reduction also for this reason. In addition, cost reduction due to a mass production effect can be achieved.

The micro-channel device according to the present technology can perform optical, electrical, and chemical detection by introducing various samples and reagents, and the like. A sample that can be used in the present technology is not particularly limited, but examples thereof include a biological sample. Examples of the biological sample include a body fluid (blood, serum, plasma, urine, or the like) and a diluted solution thereof and/or a product obtained by adding a drug thereto.

Hereinafter, each part of the micro-channel device 1 according to the present technology will be described in detail.

(2) Substrates 11a and 11b

In the present technology, a material forming a substrate is not particularly limited, and usually, a material that can be used for such as a micro-channel device such as a device for bioassay and can be thermally fused to the elastic film 12 described later can be freely selected and used. For example, a substrate of a plastic resin such as polycarbonate, a polyolefin-based resin, or an acrylic resin, a silicon-based resin such as polydimethylsiloxane (PDMS), glass, metal, or ceramics can be used.

In each of the substrates 11a and 11b, for example, a groove serving as a micro-channel, a hole through which a fluid such as a sample or a reagent passes, or a recess for mixing, stirring, cleaning, fractionating (filtering), storing, or the like a fluid such as a sample or a reagent can be formed according to a purpose. The width, depth, cross-sectional shape, and the like of a groove, a hole, a recess, and the like formed in the substrates 11a and 11b are not particularly limited, and can be freely designed according to a purpose as long as an effect of the present technology is not impaired. As these processing methods, one or more processing methods capable of forming a desired shape, such as cutting, injection molding, casting, a 3D printer, and optical shaping, can be selected and used.

The thickness of each of the substrates 11a and 11b is not particularly limited, but is preferably 0.3 mm or more in consideration of the depth of a channel or the like and mechanical strength.

(3) Elastic Film 12

In the present technology, a material forming a substrate is not particularly limited, and usually, an elastic material that can be used for such as a micro-channel device such as a device for bioassay and can be thermally fused to the substrates 11a and 11b can be freely selected and used. Examples thereof include a thermosetting resin-based elastomer such as polydimethylsiloxane (PDMS) or a fluorine-modified silicone resin, and a thermoplastic resin such as cycloolefin polymer (COP), cyclic polyolefin (COC), polyethylene terephthalate (PET), or polybutylene terephthalate (PBT).

In the elastic film 12, a hole through which a liquid such as a sample or a reagent or a gas such as air passes can be formed according to a purpose. The width, cross-sectional shape, and the like of a hole or the like formed in the elastic film 12 are not particularly limited, and can be freely designed according to a purpose as long as an effect of the present technology is not impaired. As these processing methods, one or more processing methods such as molding, drilling, and pressing can be selected and used. In addition, the elastic film 12 is supplied in a rolled state, and can be cut out by cutting or pressing.

The thickness of the elastic film 12 is not particularly limited, but is preferably 0.3 mm or less in consideration of flexibility as a functional film.

As described above, a portion of the elastic film 12 not thermally fused to either of the substrates 11a and 11b (see reference sign B in FIG. 1) can function as a functional film having various functions by utilizing elasticity thereof. The first embodiment illustrated in FIG. 1 is an example in which a part of the elastic film 12 functions as a valve.

Figure 2A:
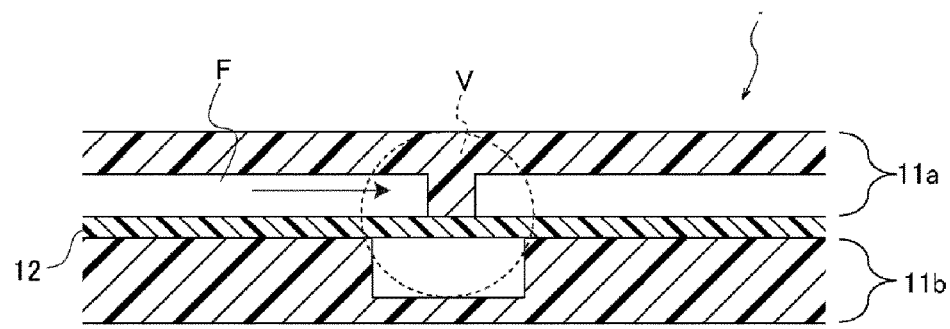
FIGS. 2a and 2b are enlarged schematic end views enlarging a portion (see reference sign V in FIG. 1) of an elastic film 12 not thermally fused to either of substrates 11a and 11b.
Figure 2B:
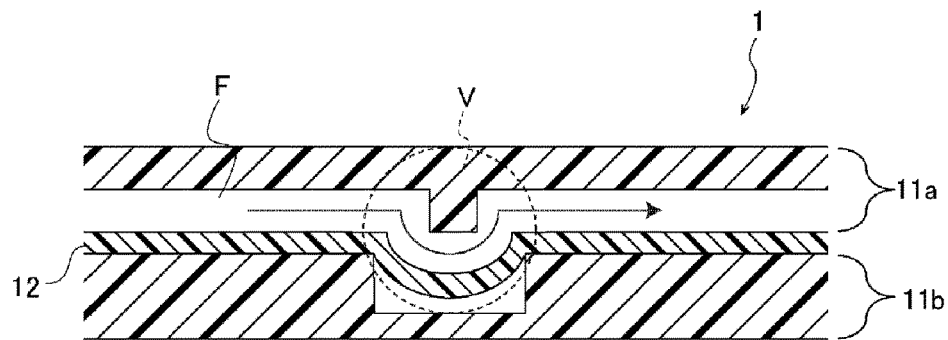

A specific example of a valve function will be described with reference to FIGS. 2a and 2b. FIGS. 2a and 2b are enlarged schematic end views enlarging a portion (see reference sign V in FIG. 1) of the elastic film 12 not thermally fused to either of the substrates 11a and 11b. When a sample or the like is caused to flow through a channel F formed in the substrate 11a, in the state of FIG. 2a, the sample or the like flows only to the valve V portion. By applying a negative pressure to the valve V portion from a side of the substrate 11b in this state, a gap is formed between the elastic film 12 as the valve V portion and the substrate 11a, and the sample or the like flows through the gap (see FIG. 2b). In this way, the portion of the elastic film 12 not thermally fused to either of the substrates 11a and 11b (see reference sign V in FIG. 1) can function as a valve for controlling flow of the sample or the like.

Figure 3:
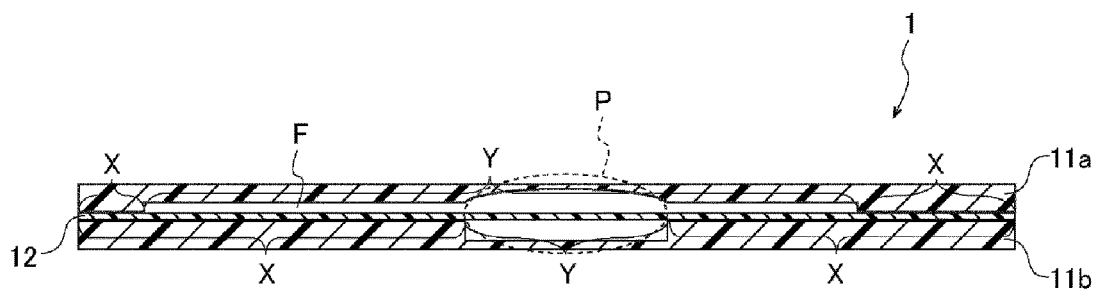
FIG. 3 is a schematic end view schematically illustrating a second embodiment of the micro-channel device 1 according to the present technology.
Figure 4A:
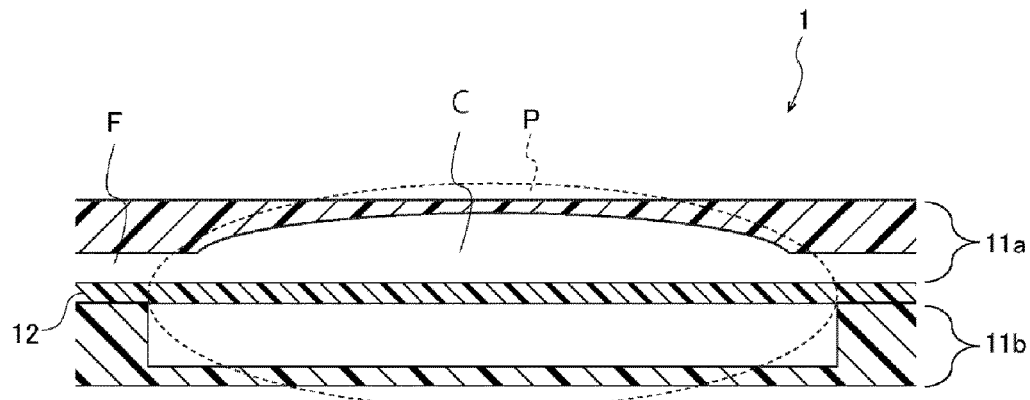
FIGS. 4a, 4b, and 4c are enlarged schematic end views enlarging a portion (see reference sign P in FIG. 3) of the elastic film 12 not thermally fused to either of the substrates 11a and 11b.
Figure 4B:
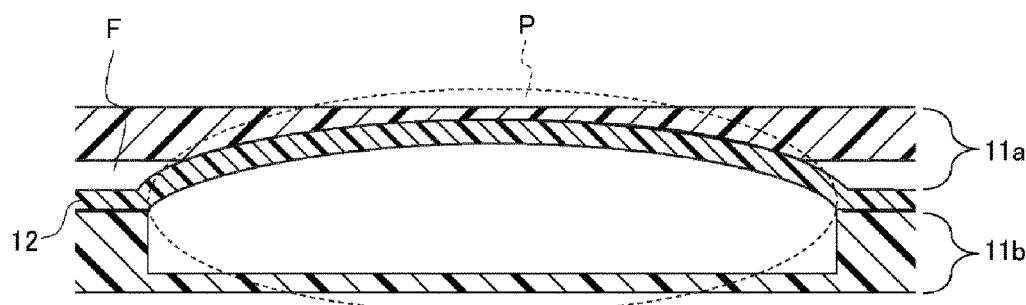
Figure 4C:
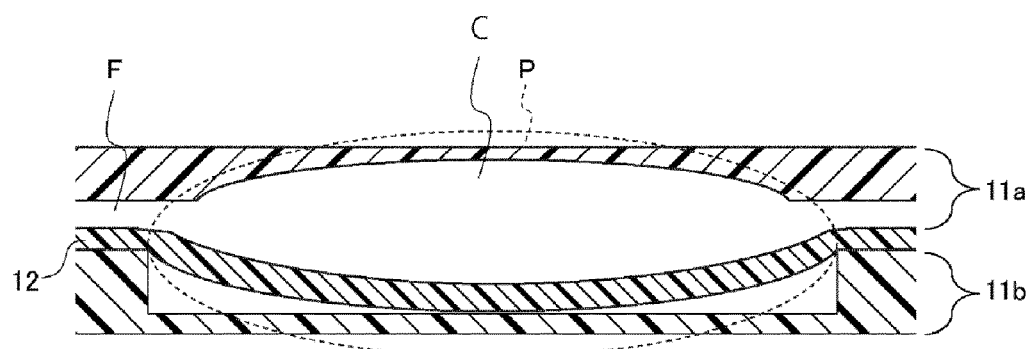

A specific example of a pump function will be described with reference to FIGS. 3, 4b, and 4c. FIG. 3 is a schematic end view schematically illustrating a second embodiment of the micro-channel device 1 according to the present technology. FIGS. 4, 4b, and 4c are enlarged schematic end views enlarging a portion (see reference sign P in FIG. 3) of the elastic film 12 not thermally fused to either of the substrates 11a and 11b. When a sample or the like is caused to flow through the channel F formed in the substrate 11a, in a state of FIG. 4a, if the sample or the like reaches a pump P portion, the sample or the like is stored in a chamber C formed in the substrate 11a. By applying a positive pressure to the pump P portion from a side of the substrate 11b in this state, a gap between the elastic film 12 as the pump P portion and the substrate 11a disappears, and the sample or the like is pushed out (see FIG. 4b). Furthermore, as illustrated in FIG. 4c, by applying a negative pressure to the pump P portion from the side of the substrate 11b, the volume of the chamber C portion formed in the substrate 11a increases, and the amount of the sample or the like stored in the chamber C can be increased. By repeating the states of FIGS. 4b and 4c, the portion of the elastic film 12 not thermally fused to either of the substrates 11a and 11b (see reference sign P in FIG. 3) can function as a pump for controlling flow of the sample or the like.

Note that the channel F, the chamber C, and the like can function as a site of physically mixing a sample, a reagent, or the like, or a chemical reaction.

Figure 5:
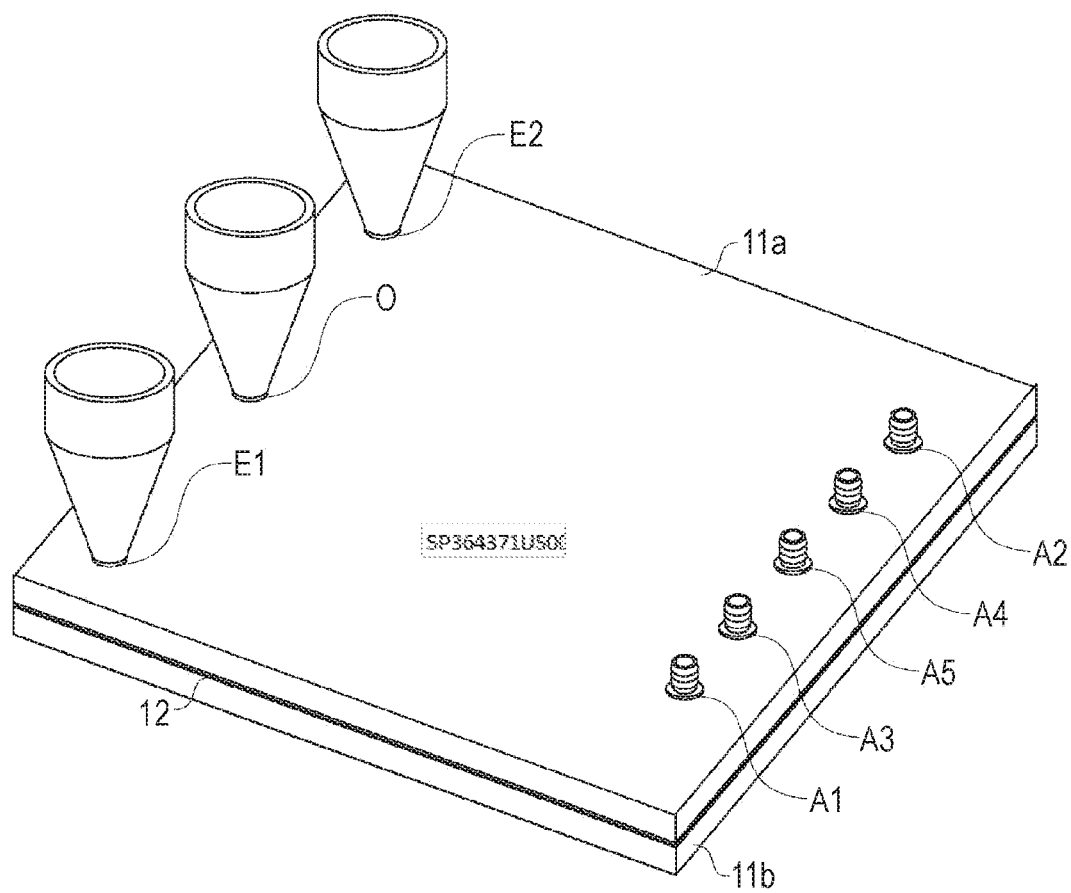
FIG. 5 is a schematic perspective view schematically illustrating a third embodiment of the micro-channel device 1 according to the present technology.
Figure 6:
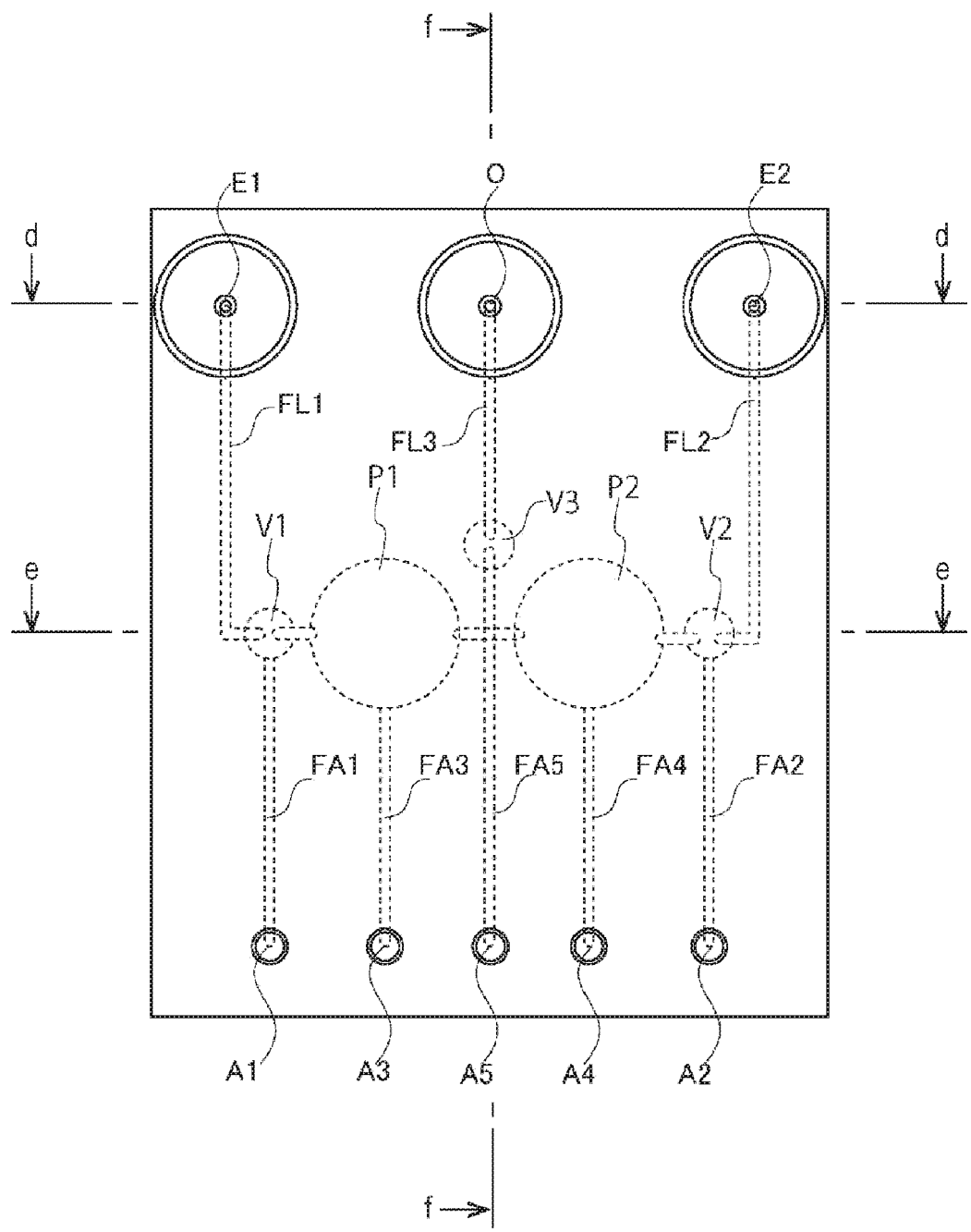
FIG. 6 is a schematic plan view of the third embodiment of the micro-channel device 1 according to the present technology as viewed from an upper direction.

FIG. 5 is a schematic perspective view schematically illustrating a third embodiment of the micro-channel device 1 according to the present technology. FIG. 6 is a schematic plan view of the third embodiment of the micro-channel device 1 according to the present technology as viewed from an upper direction. Note that FIG. 6 illustrates the substrates 11a and 11b in a transparent state for convenience. The micro-channel device 1 according to the third embodiment includes liquid inlets E1 and E2, a liquid outlet O, pneumatic ports A1 to A5, liquid channels FL1 to FL3, pneumatic channels FA1 to FA5, valves V1 to V3, and diaphragm pumps P1 and P2. Note that the pneumatic channels FA1 to FA5 are pipelines for transmitting a pressure to open and close the valves V1 to V3 and the diaphragm pumps P1 and P2 for controlling movement and mixing of a liquid.

Note that the present embodiment exemplifies a structure in which cups for introducing and discharging a liquid are disposed in the liquid inlets E1 and E2 and the liquid outlet O, and a nipple for transmitting a pneumatic pressure by a tube is press-fitted to and engaged with the pneumatic ports A1 to A5. However, it is also possible to adopt a structure in which a liquid is introduced and discharged with a tube and a nipple, a structure in which a reservoir is built-in in advance in the micro-channel device 1, or the like.

Figure 7:
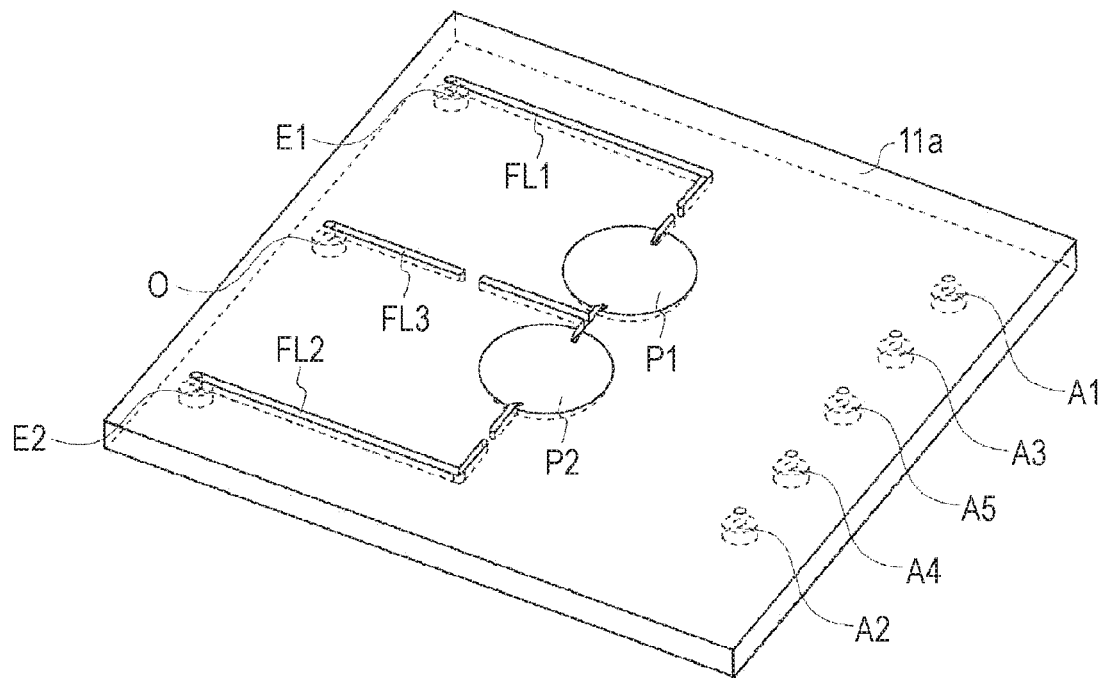
FIG. 7 is a schematic perspective view of the substrate 11a of the micro-channel device 1 according to the third embodiment as viewed from a laminated surface side to the elastic film 12.
Figure 8:
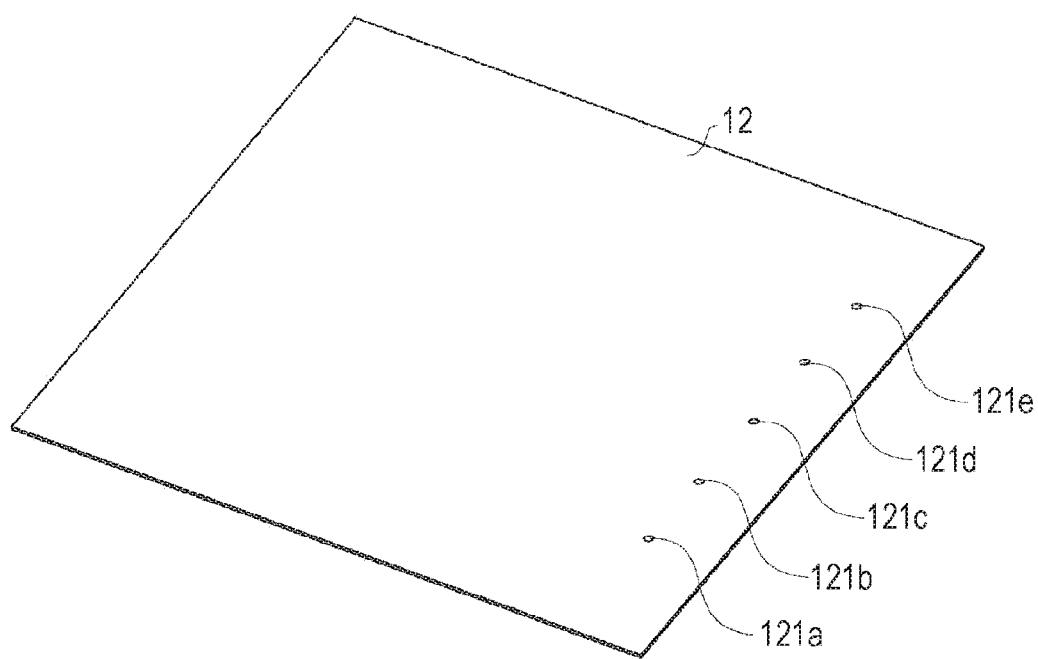
Figure 9:
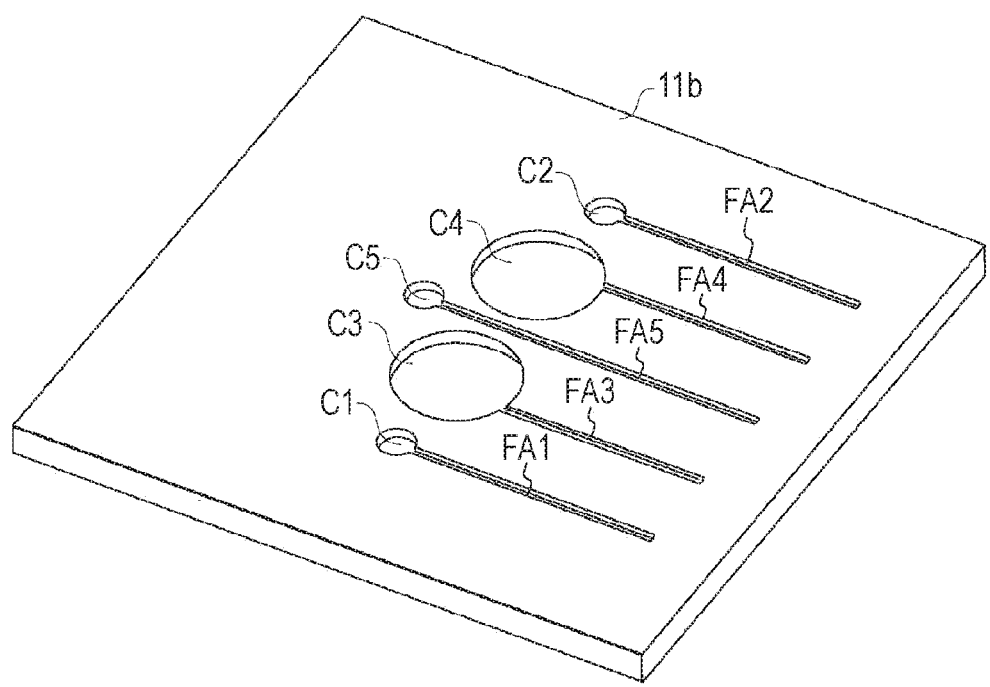
FIG. 9 is a schematic perspective view of the substrate 11b of the micro-channel device 1 according to the third embodiment as viewed from the laminated surface side to the elastic film 12.

FIG. 7 is a schematic perspective view of the substrate 11a of the micro-channel device 1 according to the third embodiment as viewed from a laminated surface side to the elastic film 12. FIG. 8 is a schematic perspective view of the elastic film 12 of the micro-channel device 1 according to the third embodiment as viewed from the laminated surface side to the substrate 11a. FIG. 9 is a schematic perspective view of the substrate 11b of the micro-channel device 1 according to the third embodiment as viewed from the laminated surface side to the elastic film 12.

As illustrated in FIG. 7, in the substrate 11a, the liquid inlets E1 and E2, the liquid outlet O, the pneumatic ports A1 to A5, grooves serving as the liquid channels FL1 to FL3, and recesses serving as the valves V1 to V3 and the diaphragm pumps P1 and P2 are formed. As illustrated in FIG. 9, in the substrate 11b, grooves serving as the pneumatic channels FA1 to FA5 communicating with the pneumatic ports A1 to A5, and recesses serving as pneumatic chambers C1 to C5 for adjusting a pneumatic pressure below the valves V1 to V3 and the diaphragm pumps P1 and P2 are formed. As illustrated in FIG. 8, in the elastic film 12, holes 121a to 121e for causing air to flow from the pneumatic ports A1 to A5 to the pneumatic channels FA1 to FA5 are formed.

Note that the structures of the substrate 11a, the elastic film 12, and the substrate 12b in FIGS. 7 to 9 exemplify a substrate and an elastic film constituting the micro-channel device 1 according to the present technology, and do not limit the lamination number of the substrate and the elastic film. The numbers of the substrate and the elastic film can be combined freely and used according to a purpose as long as the number of the substrate is two or more and the number of the elastic film is one or more.

In addition, in FIGS. 7 and 9, a channel or the like for causing a liquid to flow therethrough is formed in the substrate 11a, and a channel or the like for causing air to flow therethrough is formed in the substrate 11b. However, the present technology is not limited to this configuration. For example, a channel or the like for causing air to flow therethrough may be formed in the substrate 11a, a channel or the like for causing a liquid to flow therethrough may be formed in the substrate 11b, or a liquid channel and a pneumatic channel may be present together in one substrate.

Furthermore, holes 121a to 121e for causing air to flow from the pneumatic ports A1 to A5 to the pneumatic channels FA1 to FA5 are formed in the elastic film 12. However, the holes 121a to 121e are not necessary required depending on the configuration of a substrate. For example, although not illustrated, if design is performed such that the pneumatic ports A1 to A5 are formed on a surface opposite to a lamination surface of the substrate 12b to the elastic film 12 and a pneumatic pressure is adjusted from a lower side of the substrate 12b, it is not necessary for air to pass through the elastic film 12, and therefore the holes 121a to 121e of the elastic film 12 are not necessary.

The micro-channel device 1 according to the third embodiment has a structure in which the substrate 11a, the elastic film 12, and the substrate 11b illustrated in FIGS. 7 to 9 described above are laminated, and laminated portions other than the liquid channels FL1 to FL3, the pneumatic channels FA1 to FA5, the valves V1 to V3, and the diaphragm pumps P1 and P2 are thermally fused to and integrated with each other.

Figure 10:
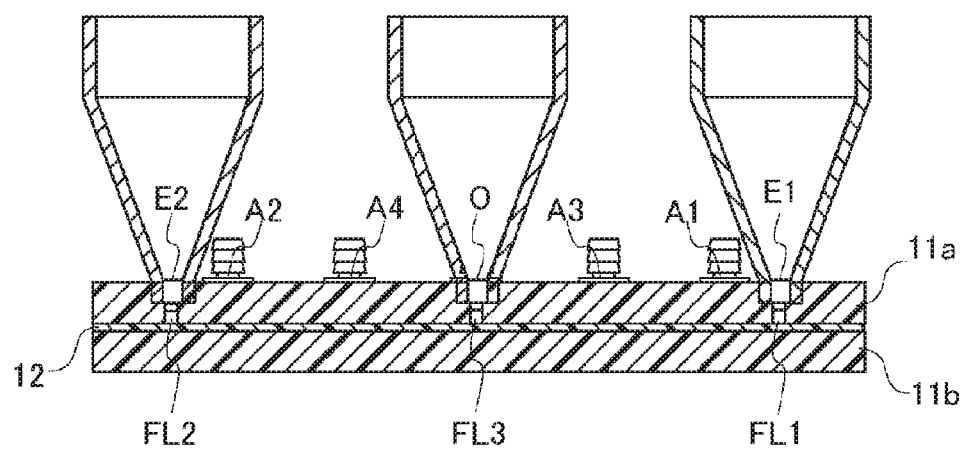
FIG. 10 is a cross-sectional view taken along line d-d of FIG. 6.
Figure 11:
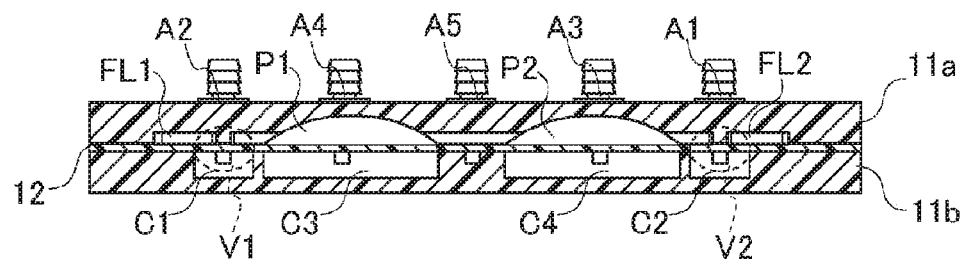
FIG. 11 is a cross-sectional view taken along line e-e of FIG. 6.
Figure 12:
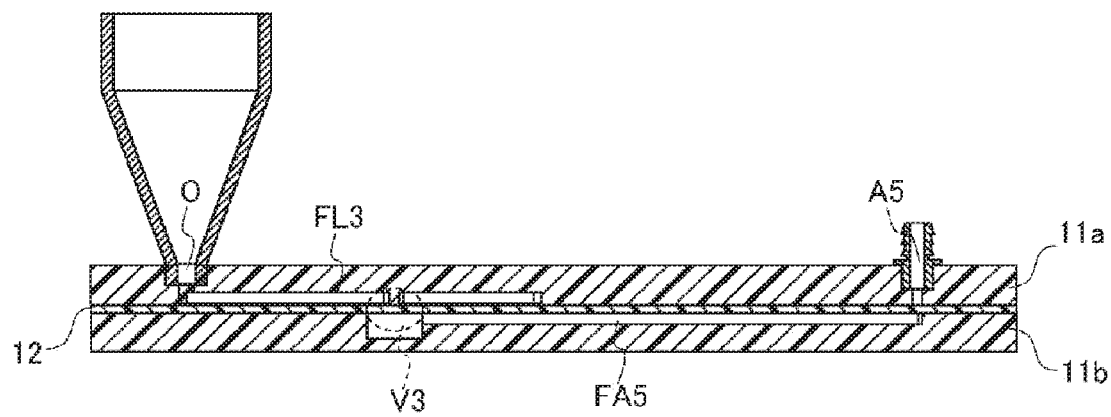
FIG. 12 is a cross-sectional view taken along line f-f of FIG. 6.

Hereinafter, a usage example of the micro-channel device 1 according to the third embodiment will be described in detail. FIG. 10 is a cross-sectional view taken along line d-d of FIG. 6. FIG. 11 is a cross-sectional view taken along line e-e of FIG. 6. FIG. 12 is a cross-sectional view taken along line f-f of FIG. 6.

First, a liquid I is introduced from the liquid inlet E1, and a liquid II is introduced from the liquid inlet E2. The liquids I and II flowing through the liquid channels FL1 and FL2 cannot pass through the valves V1 and V2 due to the elastic film 12, respectively, in a case where each of the pneumatic chambers C1 and C2 has a pressure equal to or higher than a liquid pressure (see FIG. 11). If a pressure at which the pneumatic chambers C1 and C2 have a negative pressure or a positive pressure lower than a liquid pressure is applied via the pneumatic channels FA1 and FA2, a force supporting the elastic film 12 constituting the valves V1 and V2 is decreased and deflection occurs. Therefore, a gap is generated in a deflection portion of the substrate 11a and the elastic film 12, and the liquids I and II can flow therethrough (see FIG. 2b). In this way, by controlling pressures in the pneumatic chambers C1 and C2 via the pneumatic channels FA1 and FA2, it is possible to control release and block of a flow of the liquids I and II in the valves V1 and V2.

In a case where the pressure in the diaphragm pumps P1 and P2 and the liquid channels FL1 and FL2 is equal to the pressure in the pneumatic chambers C3 and C4 and the pneumatic channels FA1 and FA2, for example, in a case where both of the pressures are an atmospheric pressure, the elastic film 12 constituting the diaphragm pumps P1 and P2 is positioned in a neutral state without deflecting. In this state, the liquids I and II which have passed through the valves V1 and V2 move into the diaphragm pumps P1 and P2, respectively.

In a case where the pressure in the pneumatic chambers C3 and C4 and the pneumatic channels FA1 and FA2 is relatively higher than the pressure in the diaphragm pumps P1 and P2 and the liquid channels FL1 and FL2, for example, in a case where the liquid side is a negative pressure and the pneumatic side is an atmospheric pressure, or the liquid side is an atmospheric pressure and the pneumatic side is a positive pressure, the elastic film 12 constituting the diaphragm pumps P1 and P2 deflects toward the substrate 11a (see FIG. 4b).

On the contrary, in a case where the pressure in the pneumatic chambers C3 and C4 and the pneumatic channels FA1 and FA2 is relatively lower than the pressure in the diaphragm pumps P1 and P2 and the liquid channels FL1 and FL2, for example, in a case where the liquid side is an atmospheric pressure and the pneumatic side is a negative pressure, or the liquid side is a positive pressure and the pneumatic side is an atmospheric pressure, the elastic film 12 constituting the diaphragm pumps P1 and P2 deflects toward the substrate 11b (see FIG. 4c).

For example, when the elastic film 12 constituting the diaphragm pump P1 deflects toward the substrate 11a and the elastic film 12 constituting the diaphragm pump P2 deflects toward the substrate 11b, the liquid I in the diaphragm pump P1 moves into the diaphragm pump P2. In this state, when the elastic film 12 constituting the diaphragm pump P1 deflects toward the substrate 11b and the elastic film 12 constituting the diaphragm pump P2 deflects toward the substrate 11a, the liquids I and II in the diaphragm pump P1 move into the diaphragm pump P2. By repeating this operation, it is possible to mix the liquids I and II, and for example, to perform desired detection or the like.

The mixed liquid of the liquids I and II which have been subjected to detection or the like is caused to flow through the liquid channel FL3 via the valve V3, and is discharged from the liquid outlet O by the same principle as the valves V1 and V2.

As described above, by adjusting the pneumatic pressures in the pneumatic chambers C1 to C5, the valves V1 to V3 and the diaphragm pumps P1 and P2 are controlled, and flow, mixing, or the like of a liquid can be performed appropriately.

A specific usage example will be described in more detail. For example, in a state where no particular pressure is applied from the pneumatic ports A1 to A5, the elastic film 12 constituting the valves V1 to V3 and the elastic film constituting the diaphragm pumps P1 and P2 are in a neutral state (FIG. 11).

Subsequently, in order to completely close the valves V1 and V2, a positive pressure is applied to the pneumatic ports A1 and A2, and the liquids I and II are introduced from the liquid inlets E1 and E2 in this state, respectively.

Subsequently, in order to discharge air in the diaphragm pumps P1 and P2, a positive pressure is applied to the pneumatic ports A3 and A4. In order to open the valve V3, a negative pressure is applied to the pneumatic port A5. By setting this state, air in the diaphragm pumps P1 and P2 is discharged from the liquid outlet O via the valve V3.

Subsequently, in order to close the valve V3, a positive pressure is applied to the pneumatic port A5. In order to open the valves V1 and V2, a negative pressure is applied to the pneumatic ports A1 and A2. In this state, in order to return the elastic film constituting the diaphragm pumps P1 and P2 to a neutral state, the pneumatic ports A3 and A4 are returned to an atmospheric pressure, or a slight negative pressure is applied in consideration of liquid feeding resistance. As a result, the elastic film 12 tends to return to a neutral state due to a restoring force of the elastic film 12 and a slight negative pressure of the pneumatic chambers C3 and C4. However, there is no air, and therefore the liquids I and II are sucked into the diaphragm pumps P1 and P2 via the valves V1 and V2, respectively.

Note that, in this case, operation of each pneumatic port may be performed simultaneously if the liquids I and II have kinematic viscosities equal to each other. However, if there is a difference, by sequential operation in which a valve of a liquid which has been injected earlier is closed and then the other liquid is injected, the two liquids can be injected in the same amount, and operation can be performed stably. In addition, it is also possible to adjust an injecting ratio into the diaphragm pumps P1 and P2 utilizing a difference in kinematic viscosity. Furthermore, although not illustrated, a valve may be disposed between the diaphragm pumps P1 and P2 to control opening and closing.

Subsequently, in order to seal the liquids I and II in the diaphragm pumps P1 and P2, respectively, and to close the valves V1 and V2 which have been open, the pneumatic ports A1 and A2 are switched to a positive pressure.

Subsequently, in order to transfer the liquid I in the diaphragm pump P1 to the diaphragm pump P2, by setting the pneumatic ports A3 and A4 to a positive pressure and a negative pressure, respectively, the liquid I is transferred to the diaphragm pump P2.

Subsequently, in order to transfer the mixed liquids I and II in the diaphragm pump P2 to the diaphragm pump P12, by setting the pneumatic ports A3 and A4 to a negative pressure and a positive pressure, respectively, the mixed liquids I and II are transferred to the diaphragm pump P1.

In this way, by repeatedly transferring the mixed liquids I and II from the diaphragm pump P1 to the diaphragm pump P2, and P2 to P1, stirring of the liquids I and II can be performed in the higher degree of mixing.

Subsequently, in order to open the valve V3, a negative pressure is applied to the pneumatic port A5. In this state, by setting the pneumatic ports A3 and A4 to a positive pressure, the mixed liquids I and II are pushed outside the diaphragm pumps P1 and P2, and are discharged from the liquid outlet O via the valve V3.

Hitherto, the functions of the valve and the diaphragm pump by the elastic film 12 have been described by exemplifying the micro-channel device 1 according to the third embodiment. However, by using a structure in which a liquid is transferred at a positive pressure or a negative pressure by combining a plurality of these functions or introducing a pneumatic pressure also to a part of a liquid circuit, or by incorporating a filter through which a gas passes but a liquid does not pass, physical and scientific input/output of an intended microchip can be realized.

2. Method for Manufacturing Micro-Channel Device

Figure 13:
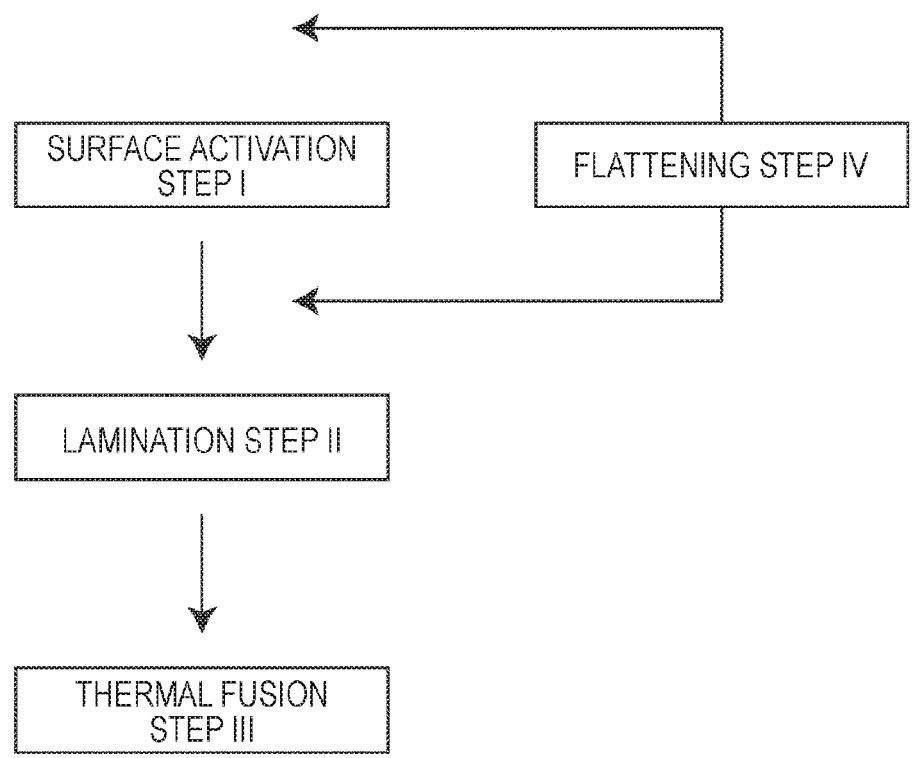
FIG. 13 is a flowchart of a method for manufacturing a micro-channel device according to the present technology.

FIG. 13 is a flowchart of a method for manufacturing a micro-channel device according to the present technology. The method for manufacturing a micro-channel device according to the present technology is a method for performing at least a surface activation step I, a lamination step II, and a thermal fusion step III. In addition, it is also possible to perform a flattening step IV as necessary. Hereinafter, each step will be described in detail.

(1) Surface Activation Step I

The surface activation step I is a step of activating a joining surface of a substrate and/or an elastic film. By subjecting each joining surface to surface activation, joining strength can be improved. In addition, the surface activation can contribute to lowering a heating temperature and the like in the thermal fusion step III described later, and crimping can be performed with high joining strength even at a temperature lower than a material softening temperature. Therefore, deformation of a substrate or a film is less likely to occur, and an adverse effect such as distortion of a channel shape or the like is less likely to occur than thermal crimping around a softening point. As a result, it is easy to uniform a channel shape and fluid dynamics characteristics. Therefore, quality is improved, a yield is improved, and a defect ratio is reduced.

A specific surface activation method performed in the surface activation step I is not particularly limited, and one or more known surface activation methods can be freely selected and used according to the kind of a substrate or an elastic film. Examples thereof include energy ray irradiation such as ultraviolet irradiation, corona discharge, or plasma discharge.

In a case where ultraviolet irradiation is performed in the surface activation step I, an ozone less low pressure mercury lamp and an ozone generator are preferably combined to be used. By performing surface activation using an ultraviolet ray of a wavelength (for example, an ultraviolet ray of 200 nm or more) capable of being propagated and emitted in the atmospheric air without generating ozone in an ozone atmosphere supplied from an ozone generator capable of controlling a concentration, the irradiation amount of the ultraviolet ray and the ozone concentration can be adjusted independently. By independently adjusting the irradiation amount of the ultraviolet ray and the ozone concentration, processing time is reduced and productivity is improved.

In the surface activation step I, a part of a joining surface can be activated while a part of a substrate and/or an elastic film is masked. For example, by performing surface activation with a portion not thermally fused, such as a portion functioning as a functional film of an elastic film, masked, the thermal fusion step III described later can be performed easily. More specifically, a surface of the masked portion is not activated, and therefore is not thermally fused unless being heated to a higher temperature than a portion which has been activated. Therefore, only a desired portion can be thermally fused at a lower temperature in the thermal fusion step III described later.

(2) Lamination Step II

The lamination step II is a step of laminating the elastic film between at least two of the substrates after the surface activation step I. A specific lamination method in the lamination step II is not particularly limited, and a known lamination method can be freely selected and used.

(3) Thermal Fusion Step III

The thermal fusion step III is a step of thermally fusing the substrate and the elastic film in at least a part thereof. A specific thermal fusion method in the thermal fusion step III is not particularly limited, and a known thermal fusion method can be freely selected and used. For example, a method is generally used in which a substrate and an elastic film laminated through the lamination step II are heated until the temperature thereof rises to the vicinity of a softening point of each material, pressed for bonding, held, and then cooled.

(4) Flattening Step IV

The flattening step IV is a step of flattening a substrate and/or an elastic film before the lamination step II. As described above, a hole, a recess, and the like are formed in the substrate and the elastic film. Therefore, a burr or the like may be generated during formation of the hole, the recess, and the like. Particularly, the elastic film is relatively thin and susceptible to processing distortion, and therefore a burr or the like is easily generated. If a burr or the like is present in the substrate or the elastic film, partial crimping floating may occur. Therefore, by flattening the substrate and/or the elastic film before the lamination step II, it is possible to prevent thermal crimping failure such as partial crimping floating, leakage of a liquid, and the like.

A specific flattening method in the flattening step IV is not particularly limited, and a known flattening method can be freely selected and used. Examples thereof include a method of flat surface hot press.

Note that the flattening step IV can be performed before or after the above-described surface activation step I as long as the flattening step IV is performed at least before the lamination step II.

Note that the present technology can have the following configurations.

(1)
A micro-channel device used in analyzing a sample, including:
at least two substrates; and
an elastic film interposed between the two substrates, in which
at least a part of the substrates is thermally fused to at least a part of the elastic film.

(2)
The micro-channel device according to (1), in which a part of the elastic film functions as a valve and/or a pump.

(3)
The micro-channel device according to (2), in which a portion of the elastic film functioning as the valve and/or the pump is not thermally fused to the substrates.

(4)
The micro-channel device according to any one of (1) to (3), in which a channel portion of each of the substrates is not thermally fused to the elastic film.

(5)
A method for manufacturing a micro-channel device used in analyzing a sample, including:
a surface activation step of activating a joining surface of a substrate and/or an elastic film;
a lamination step of laminating the elastic film between at least two of the substrates; and
a thermal fusion step of thermally fusing at least a part of the substrates to at least a part the elastic film.

(6)
The method for manufacturing a micro-channel device according to (5), in which irradiation with an energy ray is performed in the surface activation step.

(7)
The method for manufacturing a micro-channel device according to (6), in which the irradiation with an energy ray is irradiation with an ultraviolet ray.

(8)
The method for manufacturing a micro-channel device according to (7), in which an ultraviolet ray in the irradiation with the ultraviolet ray has a wavelength of 200 nm or more.

(9)
The method for manufacturing a micro-channel device according to (8), in which the irradiation with an ultraviolet ray is performed in an ozone atmosphere.

(10)
The method for manufacturing a micro-channel device according to any one of (5) to (9), in which in the surface activation step, a part of a joining surface is activated while a part of the substrate and/or the elastic film is masked.

(11)
The method for manufacturing a micro-channel device according to any one of (5) to (10), in which a flattening step of flattening the substrate and/or the elastic film is performed before the lamination step.

REFERENCE SIGNS LIST

1 Micro-channel device
11a, 11b Substrate
12 Elastic film
E1, E2 Liquid inlet

O Liquid outlet
A1 to A5 Pneumatic port
F Channel
FL1 to FL3 Liquid channel
FA1 to FA5 Pneumatic channel
V, V1 to V3 Valve
P Pump
P1, P2 Diaphragm pump
C1 to C5 Pneumatic chamber

The invention claimed is:

1. A method for manufacturing a micro-channel device, comprising:
    controlling an irradiation amount of an ultraviolet ray generated by an ozone less low pressure ultraviolet lamp, wherein the ozone less low pressure ultraviolet lamp is configured to emit the ultraviolet ray without generation of ozone;
    controlling an ozone concentration of an ozone atmosphere independent of the irradiation amount of the ultraviolet ray, wherein the ozone atmosphere is generated by an ozone generator;
    activating a joining surface of at least one of a first substrate or an elastic film by irradiation of the joining surface with the ultraviolet ray in the ozone atmosphere, wherein the irradiation is based on the irradiation amount of the ultraviolet ray and the ozone concentration;
    laminating the elastic film between the first substrate and a second substrate; and
    thermally fusing at least a part of the first substrate and a part of the second substrate to at least a part of the elastic film based on the activation.

2. The method according to claim 1, wherein the ultraviolet ray has a wavelength of at least 200 nm.

3. The method according to claim 1, further comprising masking a specific part of one of the first substrate or the elastic film other than the joining surface at a time of the activation of the joining surface.

4. The method according to claim 1, further comprising flattening one of the first substrate or the elastic film before the lamination of the elastic film between the first substrate and the second substrate.

5. The method according to claim 1, further comprising masking, at a time of the activation, a portion of the elastic film that is configured to serve as one of a valve or a pump, wherein
    the masked portion of the elastic film is not thermally fused to the first substrate and the second substrate, and
    the masked portion of the elastic film serves as one of the valve or the pump.

* * * * *